United States Patent [19]

Le Corre et al.

[11] Patent Number: 4,638,200
[45] Date of Patent: Jan. 20, 1987

[54] HIGH SPEED PERMANENT MAGNET ROTOR

[75] Inventors: Loic Le Corre, Colombes; Albert L. Rolland, Paris, both of France

[73] Assignee: Precision Mecanique Labinal, Bois d'Arcy, France

[21] Appl. No.: 822,405

[22] PCT Filed: May 21, 1985

[86] PCT No.: PCT/FR85/00121
§ 371 Date: Dec. 23, 1985
§ 102(e) Date: Dec. 23, 1985

[87] PCT Pub. No.: WO85/05506
PCT Pub. Date: Dec. 5, 1985

[30] Foreign Application Priority Data

May 23, 1984 [FR] France .................. 8408015

[51] Int. Cl.[4] ............... H02K 15/02; H02K 21/14
[52] U.S. Cl. ................... 310/156; 310/42; 310/262
[58] Field of Search ........... 310/156, 261, 262, 42, 310/216, 217, 218

[56] References Cited

U.S. PATENT DOCUMENTS

| 3,077,026 | 2/1963 | Blackburn | 29/155.53 |
| 3,531,670 | 9/1970 | Loudon | 310/156 |
| 3,956,650 | 5/1976 | Field, II | 310/156 |
| 4,117,360 | 9/1978 | Richter | 310/156 |
| 4,339,874 | 7/1982 | Mc'Carty et al. | 310/156 |
| 4,469,970 | 9/1984 | Neumann | 310/216 |
| 4,531,071 | 7/1985 | Kintz, Jr. et al. | 310/156 |

FOREIGN PATENT DOCUMENTS

| 3224904 | 1/1984 | Fed. Rep. of Germany . | |
| 195460 | 11/1983 | Japan | 310/156 |
| 82/4505 | 12/1982 | PCT Int'l Appl. . | |
| 1492691 | 11/1977 | United Kingdom . | |

OTHER PUBLICATIONS

"Sandwiched Magnetic Wafers", *Machine Design*, 31/17/150, 20 Aug. '59, p. 150.

Primary Examiner—Patrick R. Salce
Assistant Examiner—D. L. Rebsch
Attorney, Agent, or Firm—Larson and Taylor

[57] ABSTRACT

The rotor (1), which has magnets (3) in particular of the rare earth-cobalt type, is surrounded by a hoop formed by a metal which has been cold work-hardened and has a high elastic strength so as to form a sleeve which exerts on the subjacent magnets a high pre-stressing force.

11 Claims, 9 Drawing Figures

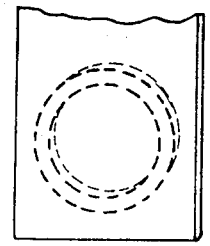
Fig. 1
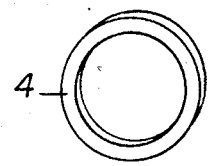
Fig. 2
Fig. 3
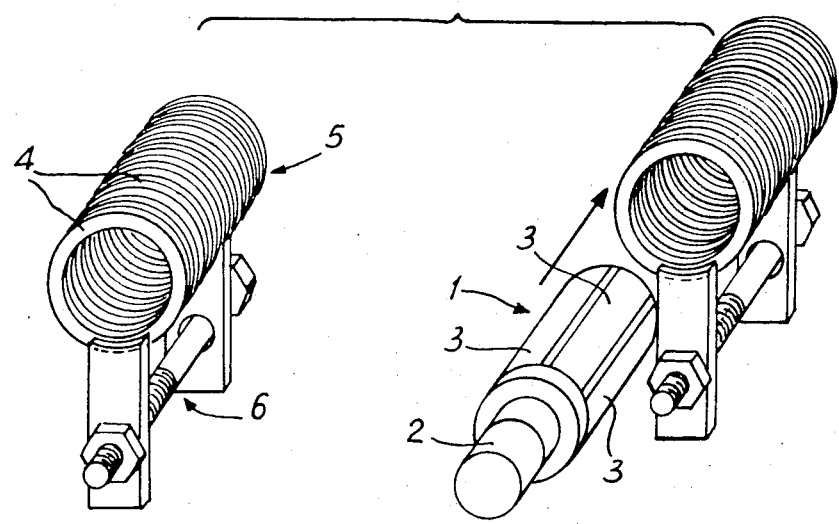
Fig. 4
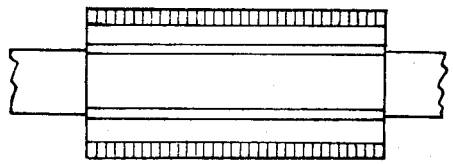

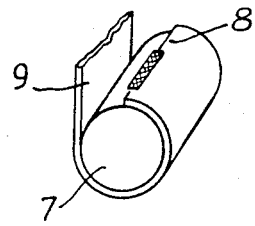
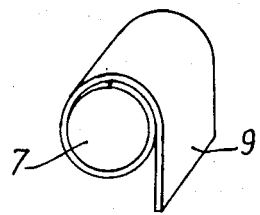
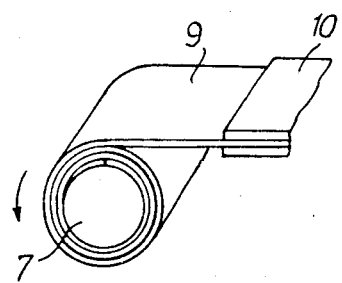
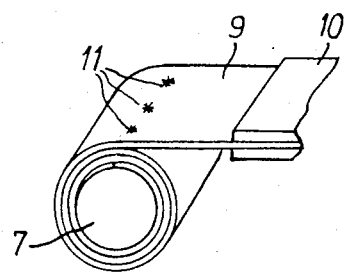
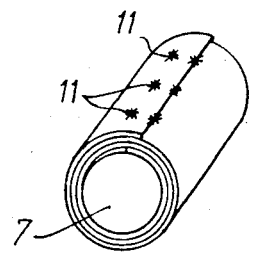

HIGH SPEED PERMANENT MAGNET ROTOR

The present invention relates to an improvement in rotating machines having magnets on the rotor and in particular to high-performance machines such as generators having a very high speed of rotation.

The development of the technology of high-performance current generators led to the construction of generators having magnets on the rotor in which the rotors are made to rotate at very high speeds, as they are, for example, directly driven by a turbine.

Owing to overall size and performance, arrangements for ensuring a mechanical fastening of the magnets are obsolete and there is therefore a tendency to employ generators having magnets which are adhered or, better still, brazed to the rotor, as described, for example, in Pat. No. 83 11,325 filed on July 7, 1983 in the name of the applicant. However, when speeds of rotation resulting in tangential velocities of more than 100 meters per second, for example 200 meters per second, are exceeded, the safety of the fastening of the magnets is no longer ensured so that such speeds cannot be reached in practice.

This is also the case of machines having magnets fixed in the conventional manner to the rotor and maintained in position by a sleeve performing the function of a hoop, the presence of which one attempts to avoid, owing to the resulting large increase in the air gap and the behavior which at high speeds of rotation does not contribute to the strength and behavior of the rotor.

The German publication DOS No. 32 24904 states that it is known to surround magnet rotors with a non-magnetic hoop composed of a material such as titanium, which, however, does not permit attaining extremely high speeds of rotation and moreover leads to the use of thick and heavy hoops which are of little benefit from the point of view of the magnetic behavior of the assembly. This is why this publication prescribes the construction of high-strength steel hoops constituted by a cylindrical sleeve which is pre-stressed by driving in wedges.

However, this solution presents drawbacks since the wedges are part of the mass and the thickness of the hoop is locally increased. The mass of the hoop is not constant over its length and the stressing requires enormous radial forces which often result in seizure. Further, this solution requires the insertion of supplementary magnetic materials for partly saturating the interpolar zones of the hoop so as to avoid a magnetic short-circuit on the rotor, and this constitutes a great complication.

Another solution resides in forming a hoop constituted by a sleeve of synthetic resin reinforced with carbon fibers and in pre-stressing the sleeve also by the insertion of wedges. However, this solution excludes any use of the device in wide temperature ranges, not only owing to the bad behavior of the hoop when there are large temperature variations but also owing to differential expansion coefficients which result in a large variation of the hoop pre-stressing, depending on the temperatures.

Various other documents describe a peripheral hooping of rotors provided with permanent magnets but do not permit the attainment of high speeds of rotation.

Thus, U.S. Pat. No. 3,531,670 desribes a hoop of non-magnetic metal such as Inconel hot shrunk onto the rotor. The allowed speeds of rotation are low relative to those required of modern permanent magnet electric machines.

The mounting of such a hoop formed by a sleeve in moreover a very delicate operation.

The Japanese patent application No. 57-78,540 describes a hoop formed by a winding of a very thick ferro-magnetic metal wire and only permits a low speed of rotation if it is compared with that of the aforementioned German patent aplication.

U.S. Pat. No. 4,117,360 describes a very thick and complex hoop for a low-speed rotor.

U.S. Pat. No. 3,077,026 describes a rotor having a low speed of rotation surrounded by a complex hoop constituted, at the two ends, by annular parts interconnected by spacer members carrying discontinuous strips. Such an arrangement allows only very low speeds of rotation and presents great complexity for a very thick peripheral hoop.

U.S. Pat. No. 2,735,952 describes a permanent magnet rotor surrounded by a very thick hoop constituted by a stack of washers adapted to receive squirrel-cage bars for starting up in the manner of an induction motor. Such an arrangement is incapable of being used in high-performance electric machines rotating at very high speeds of rotation.

The object of the present invention is to overcome these drawbacks backs and to provide an improvement in rotating machines having magnets on the rotor, such as, for example, generators adapted to rotate at very high speeds of rotation and permitting the maintenance of the cohesion of the rotor even at these very high speeds.

Another object of the invention is to provide such an improvement which is easy to employ and effective.

Another object of the invention is to provide such an improvement which affords a very high degree of reliability.

Another object of the invention is to provide such an improvement which enables the rotor to operate over a wide range of temperatures, for example ranging from −40° to +200° C.

Yet another object of the invention is to provide such an improvement which is easy and cheap to carry out.

The invention provides an improvement in rotating machines having magnets on the rotor adapted to rotate at very high speeds, such as tangential velocities of 100 m/s and more, for example 200 m/s, whose magnets are fixed to the rotor, preferably by brazing, or optionally by other means such as adhesion, characterized in that the peripheral magnets of the rotor are surrounded by a thin cylindrical hoop forming a sleeve and exerting a pre-stressing force on the subjacent magnets, said hoop being made from a non-magnetic work-hardened metal material having a high elastic limit and a small thickness.

The metal material is preferably a material having an elastic strength higher than 100 daN/mm$^2$ and preferably having a strength equal to at least 140 to 200 daN/mm$^2$.

Preferably, the thickness of the hoop does not exceed 7 mm and it may be advantageously on the order of 3 mm.

The thickness of the material upon work-hardening is preferably less than or equal to 1 mm.

A particularly suitable material may be a metal material named Phynox sold by the French firm Metal Imphy and consisting of an alloy having on the order of 40% Co, 20% Cr, 16% Ni, 7% Mo and also containing iron, sold by the firm Imphy, S.A. Paris.

In a first embodiment of the invention, the hoop is formed by a stack of thin washers having a radial width which preferably is not greater than 1 mm, these washers being stacked against each other around the rotor so as to form a hollow cylinder assembled by shrinking around the rotor so as to exert a sufficiently large pre-stressing to prevent, upon maximum speed of rotation of the rotor, the geometric possibility of a displacement of the magnets away from the surface of the rotor which carries these magnets.

In another embodiment of the invention, the hoop is formed by a winding of one or more thin bands of the metal material of high strength, the winding being effected under such conditions that the desired prestressing force is sufficiently high to prevent, when the rotor rotates at maximum speed, the geometric possibility of a displacement of the magnets away from the surface of the rotor.

The invention also provides processes for manufacturing improved rotors according to the invention.

Thus, in order to produce the rotor according to the first embodiment of the invention, a metal band of high strength is workhardened and then washers having the desired inside and outside diameters are cut from the band. These washers are optionally stacked together in advance so as to form a hollow cylinder which may be subjected to an interior grinding, but this step may be omitted if the step for manufacturing washers from the band is sufficiently precise.

The stack is then heated for example to 500° C. and then placed in position on the rotor previously cooled, for example by immersion in liquid nitrogen.

As the case may be, the peripheral surface of the sleeve thus produced by the stack of washers around the rotor may be then ground.

In order to produce a hoop according to the second embodiment of the invention, it is possible, after having work-hardened a band of metal of high strength as before, which band has preferably the width prescribed for the hoop, to fix one end of the band, for example by adhesion, to the rotor, wind it through a certain distance, for example one and a half rotations, without traction so as to cover the starting generatrix on which the band is adhered, after which the band is continued to be wound under traction so as to create the hooping force by retaining the band, for example through jaws of a brake, and rotating the rotor in the course of hooping so as to obtain the desired number of turns or coils while maintaining the pre-stressing, after which the part of the band which must form the outer end of the wound band is fixed by some means, such as brazing, welding, adhesion, clips, etc.

Further advantages and features of the invention will be apparent from the following description given by way of non-limiting examples with reference to the accompanying drawing in which:

FIG. 1 is a diagrammatic view of a part of a band of metal from which a washer must be cut, FIG. 2 is a perspective view of this washer, FIG. 3 is a view of the assembly of washers before the thermal mounting of the rotor inside the assembly, FIG. 4 is an elevational view of the rotor with a section in the region of the hoop composed of washers, FIG. 5 is a diagrammatic perspective view of a rotor at the beginning of the winding of a band, FIG. 6 is a view of this rotor after a winding of one and a half turns, FIG. 7 is a view of this rotor during the winding of the band under pre-stressed conditions, FIG. 8 is a view of the final stage of the winding of the band, and, FIG. 9 is a diagrammatic perspective view of a rotor with the band forming a hoop wound around the rotor.

Reference will first of all be made to FIGS. 1 to 4.

It is desired to produce a generator rotor 1 having a diameter of 50 mm. This rotor has front and rear bearing surfaces 2 (the rear one of which is not shown), the part of the rotor proper comprising a plurality of tangential magnets, for example six magnets 3, formed by elongated bars having a cylindrical outer surface, these magnets 3 being adhered, or preferably brazed, by their hidden side to the corresponding surfaces of the rotor.

The magnets 3 are advantageously magnets composed of rare earth, in particular $Sm\, Co_5$, brazed to the soft iron core of the rotor in accordance with the process described in the aforementioned French patent application of the applicant.

There are produced from a band shown in FIG. 1 made from a material such as the material sold under the name Phynox by the aforementioned firm Metal Imphy having, after a cold work-hardening, an elastic strength of 240 daN/cm$^2$, a plurality of washers obtained by cutting out or blanking.

The thickness of the band is for example five-tenths of a millimeter.

FIG. 2 shows such a washer which consequently has an axial thickness of five-tenths of a millimeter, an inside diameter of 50 mm and an outside diameter of 58 mm.

A cylindrical stack 5 is then formed by a plurality of these individual washers 4 and maintained by fixing or clamping means 6 of any type. This stack is achieved with great accuracy and is subjected, if required, to an internal grinding step so as to form an inner cylindrical passage of the required diameter, for example 50 mm. In the case where the precision of the fabrication by a blanking out of the washers is sufficient, this machining step may be omitted.

The rotor 1 is then plunged into liquid nitrogen and the stack is heated to 500°, then the rotor is slid into the stack of washers and the temperatures are allowed to balance out. At the end of this thermal fitting together, there is obtained a pre-stressing of the washers on the rotor on the order of 800 N/mm$^2$. This pre-stressing is sufficient to prevent a geometric radial separation of the magnets 3 from the subjacent part of the rotor 1 at a speed of rotation of 90,000 rpm.

If required, the outer surface of the stack of washers may also be ground, either before or after mounting the hoop on the magnet rotor.

Reference will now be made to FIGS. 5 to 9 in which the magnet rotor has been shown diagrammatically by a simple cylinder 7. This time, one starts with a band of the same work-hardened Phynox material having a thickness of 0.1 mm. The winding is begun by fixng the end 8 of this band 9 along generatrix of the rotor 7, for example by a very thin adhesive ribbon. One and a half turns are then made with the band without traction, as shown in FIG. 6, so as to cover the generator which received the end of the band 9.

The winding of the band is then continued, as shown in FIG. 7, by this time exerting a traction on the band, for example by means of a brake 10 which tends to oppose the winding of the band onto the rotor 7 which is mounted on a suitable rotating mandrel. The force of traction is adapted to the thickness and width of the band and to the desired prestressing, which may be obtained simply by adjusting the brake 10. After having produced thirty complete turns, corresponding to a wound thickness of 3 mm, the winding is stopped and the last coil of the band is fixed to the subjacent coil or coils, for example by spot-welds 11 forming a stop. Instead of welding, there may be used any other suitable means, such as brazing, adhesion, clips, etc., provided that the connection obtained has great strength.

The band between the line formed by the stop spots 11 and the jaw is then cut and the end edge of the band is fixed by further stop spots to the subjacent coil, as shown in FIG. 9.

There has thus been formed a hoop consisting of a winding of a mean thickness on the order of 3 mm, exerting a pre-stressing of 1500 N/mm².

Tests carried out have shown that the magnet rotors thus produced have the required strength at high speeds of rotation in difficult environments in which the temperature may rise to beyond 200° C.

By way of an example, there may also be produced an improvement according to the invention by using, instead of the material Phynox, a work-hardened non-magnetic alloy of 41% Co, 26% Ni, 12% Cr, including Be and Bi, named DURATHERM sold by the firm Vacuumschmeltze GmbH, of Hanau of the Federal Republic of Germany, this material having an elastic limit of about 140 daN/mm².

Although the invention has been described with respect to particular embodiments, it is understood that it is in no way limited thereto and that various modifications as to forms and materials may be made therein without departing from its scope or spirit.

We claim:

1. In rotors for rotating machines having peripheral magnets on the rotor adapted to rotate at very high speeds, in particular in machines whose magnets are fixed to the rotor, the improvement characterized in that the peripheral magnets of the rotor are surrounded by a thin cylindrical hoop forming a sleeve and exerting a pre-stressing force on the subjacent magnets, said hoop being made from one or more thin bands wound around the rotor under conditions which produce a pre-stressing force having a magnitude such that when the rotor rotates at maximum speed, the geometric possibility of the magnets coming away from the surface of the rotor is prevented, said band being made from a non-magnetic, work-hardened, metallic material having a high elastic limit and a small thickness.

2. Improvement according to claim 1, characterized in that the material has an elastic strength of higher than 100 daN/mm² and in particular higher than 140 to 200 daN/mm².

3. Improvement according to claim 1, characterized in that the thickness of the hoop does not exceed 7 mm.

4. Improvement according to claim 1, characterized in that the thickness of the material upon work-hardening is less than or equal to 1.5 mm.

5. Improvement according to claim 1, characterized in that the metallic material is a material name Phynox and consists of an alloy having on the order of 40% Co, 20% Cr, 16% Si, 7% Mo and also containing iron.

6. In rotors for rotating machines having peripheral magnets fixed on the rotor which is adapted to rotate at very high speeds, the improvement characterized in that the peripheral magnets of the rotor are surrounded by a thin cylindrical hoop forming a sleeve and exerting a pre-stressing force on the subjacent magnets, said hoop being formed by a stack of thin washers, said washers being stacked together around the rotor so as to form a hollow cylinder which is assembled by a thermal fit around the rotor and exerts on the rotor, and in particular on the magnets, a pre-stressing force having a magnitude such that when the rotor rotates at maximum speed, the geometric possibility of the magnets coming away from the surface of the rotor is prevented.

7. Improvement according to claim 6 characterized in that said washers are cut from a band of high strength metal that has been work-hardened, said cut washers having the desired inside and outside diameters, and said washers are mounted on the rotor.

8. Improvement according to claim 7 characterized in that said hollow cylinder is formed by stacking said washers prior to the washers being mounted on the rotor.

9. Improvement according to claim 8 characterized in that said hollow cylinder of stacked washers has an internal bore that has been sized by grinding.

10. Improvement according to claim 1 characterized in that said one or more bands is of work-hardened metal;

wherein said improvement further includes first means for fixing a first inner end of said band to the rotor, and second means for fixing the second, outer end of said band after having been wound around the rotor; and wherein said hoop is made by using said first means to attach said inner band end to said rotor, winding said band without traction a certain distance so as to cover the starting generatrix on which said band is initially fixed, winding said band while exerting traction so as to exert a braking force while retaining the band so as to obtain the desired number of turns while maintaining the pre-stressing, and by using said second means to fix said outer band end.

11. Improvement according to claim 10 characterized in that said second means includes at least one of brazing, welding, adhesion, and clips.

* * * * *